United States Patent [19]

Kirner

[11] Patent Number: 4,500,894

[45] Date of Patent: Feb. 19, 1985

[54] DEVICE FOR COVERING AND CLEANING THE DISCHARGE OPENINGS OF INK PRINTING HEADS

[75] Inventor: Wilhelm Kirner, Munich, Fed. Rep. of Germany

[73] Assignee: Siemens Aktiengesellschaft, Berlin & Munich, Fed. Rep. of Germany

[21] Appl. No.: 466,890

[22] Filed: Feb. 16, 1983

[30] Foreign Application Priority Data

Feb. 26, 1982 [DE] Fed. Rep. of Germany ....... 3207072

[51] Int. Cl.[3] ............................................ G01D 15/18

[52] U.S. Cl. ............................................ 346/140 R

[58] Field of Search .................................... 346/140 R

[56] References Cited

U.S. PATENT DOCUMENTS

| | | | |
|---|---|---|---|
| 4,112,435 | 2/1977 | Kattner et al. | |
| 4,153,901 | 5/1979 | White | 346/140 X |
| 4,199,767 | 4/1980 | Campbell | 346/140 X |
| 4,343,013 | 8/1982 | Bader | 346/140 |
| 4,371,881 | 6/1983 | Bork et al. | |
| 4,401,990 | 8/1983 | Aiba | 346/140 X |

FOREIGN PATENT DOCUMENTS

| | | |
|---|---|---|
| 2321273 | 4/1973 | Fed. Rep. of Germany . |
| 2519160 | 4/1975 | Fed. Rep. of Germany . |
| 2025853 | 7/1979 | United Kingdom . |

*Primary Examiner*—Joseph W. Hartary

*Attorney, Agent, or Firm*—Hill, Van Santen, Steadman & Simpson

[57] ABSTRACT

A cover and cleaning device for ink printing heads consisting of a sealing plate pivotably disposed in front of the nozzle plate, said sealing plate having a cut-out with sharp edges in the area of the discharge openings of the nozzle plate, and being held by means of a tension strap. A crank mechanism has a crank pin which engages a slot of the sealing plate for moving the sealing plate back and forth between two detents. The sealing plate and crank mechanism are allocated to the print head. The sealing plate can be coated with a teflon film.

5 Claims, 2 Drawing Figures

DEVICE FOR COVERING AND CLEANING THE DISCHARGE OPENINGS OF INK PRINTING HEADS

BACKGROUND OF THE INVENTION

1. Field of the Invention

The present invention relates to an ink jet printer, and more particularly to a means for covering and cleaning the print head of an ink jet printer.

2. The Prior Art

A device for covering the discharge openings of an ink printing head is disclosed in the German AS No. 23 21 273. In that arrangement, the cover is operative only when the print head is located in a specific position. The print head must always be brought into a specific position in order to cover the discharge openings of the nozzle channels of the print head. That complicates the manner of functioning of the print head, and also requires a complicated structure.

A guard and cleaning device for print heads in ink printing devices is known from the German LP No. 26 07 313, in which an ink deflection diaphragm and a stripping element secured thereto are pivoted in front of the nozzle plate of the print head. When the ink deflection diaphragm is situated in front of the nozzle plate, then the discharge openings are protected against contamination. A stripping element resiliently placed against the nozzle plate also cleans the discharge openings during a pivot operation. Although this device, which is structurally connected to the print head, makes it possible for the deflection diaphragm and the stripping element to be actuated independently of the position of the print head, the covering is not sufficient, since fine dust can enter between the deflection diaphragm and the nozzle plate, which can lead to a blockage of the nozzles. The discharge openings are also exposed to air, which often leads to a rapid drying of the ink resulting in blockage of the discharge nozzles.

SUMMARY OF THE INVENTION

A principle object of the present invention is to provide a device which guarantees a sure and reliable closure of the discharge openings, independently of the position of the carriage, which simultaneously prevents external contaminations of the discharge openings, and which has a relatively simple construction. These objects are achieved in the present invention, by having the sealing plate and the nozzle plate are secured in common to the print head, so that a sealing ring gives a nearly absolute certainty against the emergence of ink.

It is a further advantage of the present invention that the largest part of the nozzle plate remains covered by the cover element, which has a cut-out and is pivotable as a sealing plate against the nozzle plate. The nozzle plate remains largely covered even when the discharge openings are open (or released), which makes additional cleaning superfluous.

It is a further advantage of the present invention that the sharp edges of the cut-out in the sealing plate represent a very effective cleaning mechanism for the discharge openings of the nozzle plate, since external contaminations are reliably eliminated when the sealing plate with its cut-out is pivoted across the discharge openings.

In the present invention, the sealing plate is rotatably seated and can be pivoted in a simple manner by use of a crank mechanism. Connected therewith is a simple structure which has only a insignificant influence on the overall structure of the print head. According to a further development of the invention, the sealing plate can be coated with a film, such as a teflon film, which provides friction-free operation and great resistance to wear. That has a particularly favorable effect on the dimensioning of the drive element.

BRIEF DESCRIPTION OF THE DRAWINGS

Details of the invention will be described with reference to the sample embodiment illustrated in the drawings, in which.

DESCRIPTION OF THE PREFERRED EMBODIMENT

Figure 1:
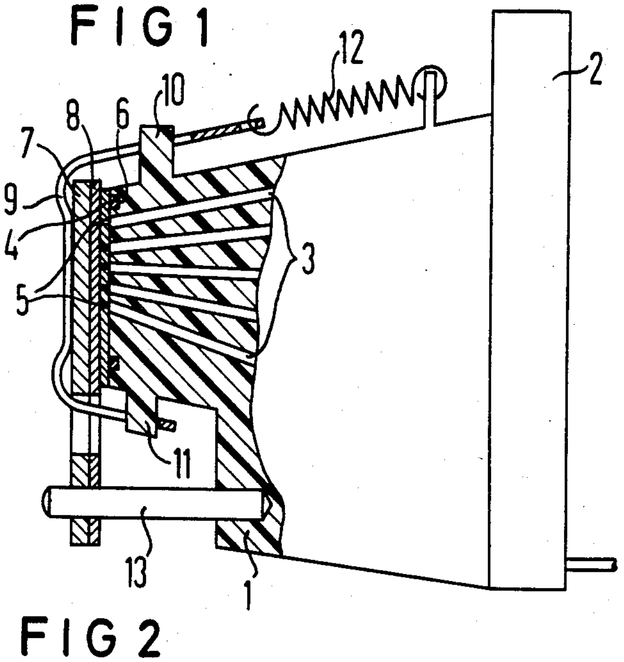
FIG. 1 shows a print head in a side view.

The print head illustrated in FIG. 1 consists of a synthetic body 1 in which the ink channels 3 extend between a supply part 2 and a boundary surface of the print head which faces a recording medium (not illustrated here). The print head is terminated with a nozzle plate 4, having discharge openings 5 through which ink droplets are ejected in the direction of the recording medium. The drive elements for the ink channels 3 which enable the ejection of the ink droplets are, for example, piezo-elements. These are situated in the inside of the print head and are not visible in this illustration. The nozzle plate 4 is surrounded by a sealing ring 6. The sealing plate 7, which is coated with a film such as a Teflon film 8 on its side facing the print head, is provided for covering and for cleaning the discharge openings 5. The sealing plate 7, together with the nozzle plate 4, are secured to the print head 1 by means of a resilient strap 9. Two projections 10 and 11, received in an elongate opening in the strap 9, are mounted on the print head 1. The strap is held by means of a tension spring 12. In this way, the sealing ring is deformed by the force exerted by the strap 9, so that an exact seating of the nozzle plate 4 on the limiting or discharge surface of the print head is provided, resulting in a very reliable seal. The sealing plate 7 is rotatably mounted on a pin 13, which is secured to the print head.

Figure 2:
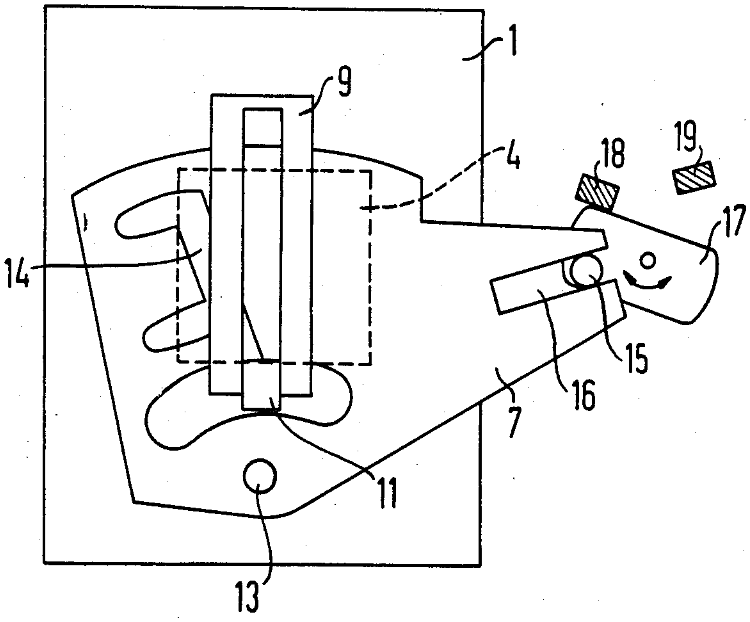
FIG. 2 shows the print head according to FIG. 1 in a front view, with details of the drive mechanism.

The operation of the apparatus is explained below with reference to FIG. 2. FIG. 2 shows the print head from the front. The sealing plate 7 is pivotably mounted on a pin 13, in front of the nozzle plate 4, in such a manner that the cut-out 14 of the sealing plate 7 either closes (the illustrated position in FIG. 2) or releases the discharge openings of the nozzle plate 7. The sealing plate 7 is dimensioned such that said sealing plate covers the nozzle plate 4 both in the open position (with discharge openings released) as well as in the closed position (with discharge openings closed). Thus, the sealing surface of the sealing plate 7 is covered at all times, so that it does not require any additional cleaning. The pivoting is caused by a crank mechanism 17, having a crank pin 15 which engages a slot-shaped recess 16 of the sealing plate 7. The crank mechanism 17 is rotated, by a shaft, between two detents 18 and 19, by means of a drive element not illustrated here, so that the sealing plate 7 with the cut-out 14 closes or releases the discharge openings. This arrangement allows motion of the sealing plate 7, independently of the position of the print head, i.e., the sealing plate 7 and the drive mechanisms 15, 17, 18 and 19 are mounted directly on the print head.

When, as proposed by the present invention, the cut-out 14 is designed with sharp edges, then a wiping function is executed at every pivot motion of the sealing plate and, thus, at every pivot motion of the cut-out 14, the discharge openings of the nozzle plate are reliably cleaned of external contamination such as dust particles, ink residues, etc. by means of the wiping function.

The sealing plate 7 has only a very small thickness so that the spacing between, for example, a platen and the print head need be only insignificantly reduced.

What is claimed is:

1. A device for sealing and cleaning the discharge openings of a nozzle plate having plural discharge openings in an ink printing head, including in combination:

a sealing plate mounted for movement relative to the nozzle plate;

said sealing plate having a cut-out adapted to be aligned with the front of the discharge openings during the print periods, to release such openings;

said cut-out being sharp-edged for executing a cleaning function as it is moved relatively to said nozzle plate;

a pressure element for forcing said sealing plate and said nozzle plate against the limiting surface of said print head at which the ink channels terminate;

and a sealing ring which is deformed by said pressure element being provided between the limiting surface of said print head and said nozzle plate.

2. The device according to claim 1, wherein said sealing plate is rotatably seated on a pin secured to the print head, and said sealing plate has a slot-shaped recess for receiving the crank pin of a crank mechanism.

3. The device according to claim 1, wherein said sealing plate covers the nozzle plate both in its open and in its closed position.

4. The device according to claim 1, wherein said sealing plate is coated with a Teflon film on its side facing the nozzle plate.

5. The device according to claim 3, wherein said nozzle plate is planar, and said sealing plate has a planar surface in close sliding and scraping engagement with said nozzle plate.

* * * * *